United States Patent
Toksvig et al.

(10) Patent No.: US 10,567,649 B2
(45) Date of Patent: Feb. 18, 2020

(54) PARALLAX VIEWER SYSTEM FOR 3D CONTENT

(71) Applicant: Facebook, Inc., Menlo Park, CA (US)

(72) Inventors: Michael John Toksvig, Palo Alto, CA (US); Joyce Hsu, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/987,747

(22) Filed: May 23, 2018

(65) Prior Publication Data

US 2019/0037137 A1  Jan. 31, 2019

Related U.S. Application Data

(60) Provisional application No. 62/539,518, filed on Jul. 31, 2017.

(51) Int. Cl.
| | |
|---|---|
| *H04N 5/232* | (2006.01) |
| *G06T 19/00* | (2011.01) |
| *G06F 3/01* | (2006.01) |
| *H04N 13/398* | (2018.01) |
| *H04N 13/373* | (2018.01) |
| *H04N 13/344* | (2018.01) |

(52) U.S. Cl.
CPC ......... *H04N 5/23238* (2013.01); *G06F 3/012* (2013.01); *G06T 19/003* (2013.01); *G06T 19/006* (2013.01); *H04N 13/344* (2018.05); *H04N 13/373* (2018.05); *H04N 13/398* (2018.05)

(58) Field of Classification Search
CPC ... H04N 5/23238; G06F 3/012; G06T 19/003; G06T 19/006
See application file for complete search history.

(56) References Cited

U.S. PATENT DOCUMENTS

| | | | | |
|---|---|---|---|---|
| 6,011,581 A | * | 1/2000 | Swift | G02B 27/0093 348/58 |
| 6,985,168 B2 | * | 1/2006 | Swift | G02B 27/0093 348/58 |
| 8,704,879 B1 | | 4/2014 | Cheng et al. | |
| 8,913,790 B2 | | 12/2014 | Hennessy | |
| 9,118,894 B2 | | 8/2015 | Shinohara et al. | |

(Continued)

OTHER PUBLICATIONS

PCT International Search Report and Opinion, PCT Application No. PCT/US2018/044228, dated Dec. 3, 2018, thirteen pages.

*Primary Examiner* — Jamie J Atala
*Assistant Examiner* — Michael Robert Cammarata
(74) *Attorney, Agent, or Firm* — Fenwick & West LLP

(57) ABSTRACT

A parallax viewer system allows 3D content, such as 360 degree 3D panoramas or other 3D environments, to be viewed by a user through a traditional 2D screen. A parallax viewer system operating on a user device can use a user-facing camera and a 2D screen to simulate a 3D environment for a user viewing the 2D screen. By changing the rendered view of the 3D environment as the user's head moves with respect to the screen, the parallax viewer system can provide many of the immersion benefits of a VR or 3D display using a traditional 2D display. In some implementations, the parallax viewer system can be calibrated to work in new situations (for example, on a new user device) by determining the relationship between the user-facing camera and the screen used to display the virtual environment.

12 Claims, 10 Drawing Sheets

(56) References Cited

U.S. PATENT DOCUMENTS

| | | | |
|---|---|---|---|
| 9,342,925 B2* | 5/2016 | Fujiwara | G06T 15/20 |
| 9,509,922 B2* | 11/2016 | Reichert, Jr. | G06T 3/00 |
| 10,063,848 B2* | 8/2018 | Posa | H04N 21/42202 |
| 2005/0059488 A1* | 3/2005 | Larsen | A63F 13/10 |
| | | | 463/36 |
| 2007/0279590 A1 | 12/2007 | Ebisawa | |
| 2011/0187706 A1* | 8/2011 | Vesely | G06T 15/00 |
| | | | 345/419 |
| 2012/0188279 A1* | 7/2012 | Demaine | A63F 13/10 |
| | | | 345/633 |
| 2013/0267317 A1 | 10/2013 | Aoki et al. | |
| 2014/0282196 A1 | 9/2014 | Zhao et al. | |
| 2014/0317575 A1* | 10/2014 | Ullmann | G06T 19/20 |
| | | | 715/852 |
| 2015/0022664 A1 | 1/2015 | Pflug et al. | |
| 2015/0309571 A1* | 10/2015 | Cheng | G06F 3/013 |
| | | | 345/419 |
| 2016/0104313 A1 | 4/2016 | Du et al. | |
| 2017/0287194 A1* | 10/2017 | Katz | H04N 5/2251 |
| 2017/0352183 A1* | 12/2017 | Katz | G06T 19/006 |

* cited by examiner

PARALLAX VIEWER SYSTEM FOR 3D CONTENT

BACKGROUND

Virtual reality (VR) content, 3D content, or other 360 degree panoramic content can provide a uniquely immersive experience to a user. For example, giving a user the ability to "look around" inside a virtual environment or other 3D scene while motion or other activity occurs around the user. However, using conventional display methods, 3D content, such as 360 degree 3D panoramas or other 3D environments, can either be viewed through a traditional 2D screen or experienced in 3D using specialized and expensive equipment, such as a head-mounted VR display or other specialized display designed for displaying content in 3D. When viewing 3D content using a head-mounted VR display (or other specialized display) the full immersion benefits of VR or 360 degree panoramic content can be realized. In contrast, traditional methods of displaying content on 2D screens display 3D content the same way 2D content (such as a TV show or movie) would be displayed, that is, the 3D content is presented on the 2D screen assuming a static viewpoint for the user. In many cases traditional methods of presenting 3D content on a 2D screen do not effectively create the impression that a user is viewing a 3D environment or provide immersion benefits over viewing traditional 2D content. Due to the high cost and relative unavailability of head-mounted VR displays and other 3D display systems, many users are unable to take advantage of the immersion benefits of VR and 360 degree panoramic content. Therefore, improved methods of viewing immersive VR or 360 degree panoramic content on a 2D screen are needed.

SUMMARY

A parallax viewer system allows 3D content, such as 360 degree 3D panoramas or other 3D environments, to be viewed by a user through a traditional 2D screen. A parallax viewer system operating on a user device can use a user-facing camera and a 2D screen to simulate a 3D environment for a user viewing the 2D screen. By changing the rendered view of the 3D environment as the user's head moves with respect to the screen, the parallax viewer system can provide many of the immersion benefits of a VR or 3D display using a traditional 2D display. For example, the parallax viewer system can allow a user to "look around" inside the 3D environment by moving their head as if looking through a window formed by the screen.

In some embodiments, a user-facing camera is used to track the user's position in space relative to the camera. This camera-relative position can then be translated to identify the user's position relative to the screen of the user device. In some implementations, the parallax viewer system can be calibrated to work in new situations (for example, on a new user device) by determining the relationship between the user-facing camera and the screen used to display the virtual environment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Currently, 3D content, such as 360 degree 3D panoramas or other 3D environments can be viewed by a user through a traditional 2D screen, or experienced in 3D using specialized and expensive equipment, such as head-mounted displays. When viewing content on traditional screens remote from the user, the presentation of 3D content typically assumes a constant viewpoint for the user and does not effectively create the impression that a user is viewing a 3D environment, for example by failing to simulate the natural sense of parallax that occurs when a user's head moves relative to the screen. As disclosed herein, a parallax viewer system uses a user-facing camera and a screen of a user device to present 3D content to a user and simulate parallax for a user by changing the rendered view of the 3D as the user's head moves with respect to the screen. A parallax viewer system can provide many of the immersion benefits of a VR or 3D display using a traditional 2D display.

In some embodiments, a user-facing camera, for example of a laptop or smartphone, is used along with face tracking software to track the user's eye position in space relative to the camera. This camera-relative position can then be translated to identify the eye's position relative to the screen of the user device. Based on the user's eye position relative to the screen of the device, a 3D environment or other suitable 3D content is interactively rendered, for example allowing the user to appear to "look around" inside a 3D environment by moving their head as if looking through a window formed by the screen of the device. In many cases, user-facing cameras are inexpensive and/or built into common consumer electronics, allowing a parallax viewer system to inexpensively be set up on a wide variety of user devices and/or display systems.

Figure 1A:
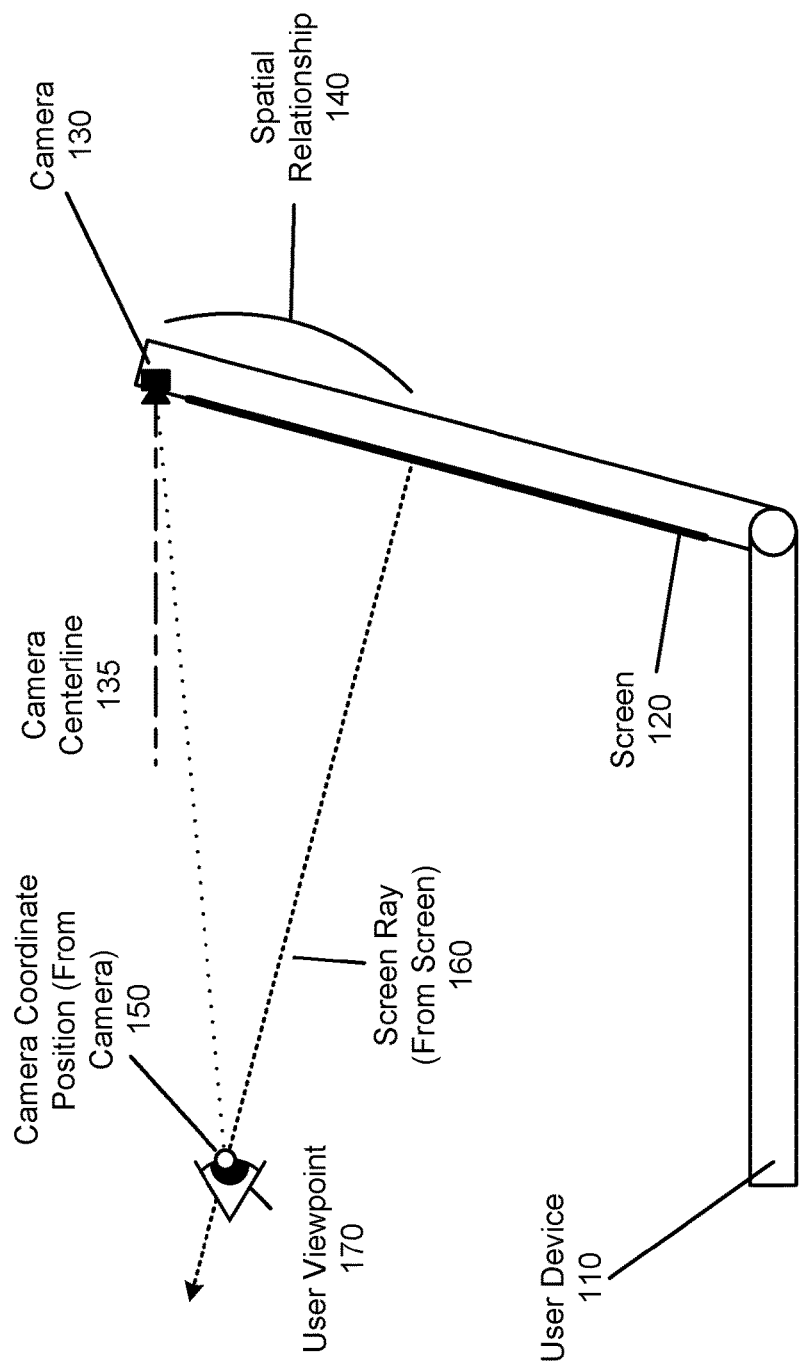
FIG. 1A illustrates an example environment in which a parallax viewer system can operate, according to one embodiment.

FIG. 1A illustrates an example environment 100 in which a parallax viewer system can operate. FIG. 1A includes a user device 110 comprising a screen 120 and a camera 130 oriented along a camera centerline 135. The user device 110 can include or be connected to a camera 130 capable of capturing images useable to determine the relative positioning of a user and the screen 120. The user device 110 may be a laptop computing system as shown in FIG. 1A, a mobile device, tablet computer, desktop computing system, or any other suitable device. In some embodiments, the camera 130 captures images or video of a user viewing the screen 120 and may be integrated into the body of the user device 110 or be a separate webcam or other suitable digital camera communicatively connected with the user device 110. For example, the camera 130 may be placed above the screen 120 (as shown in FIG. 1A) or in another location proximate to the screen 120 to capture the movement of the user. In general, various positions of the camera 130 may be used that permit the camera to view the movement of the user's viewpoint 170 with respect to the screen 120. Thus, in different implementations or situations, the camera 130 may vary in its position, viewing angle, orientation, or other positional characteristics with respect to the screen 120. The screen 120 and camera 130 have a constant spatial relationship 140 used in the operation of the parallax viewer system. The spatial relationship 140 can initially be unknown to the parallax viewer system (for example, if the parallax viewer system is used with an unknown or unfamiliar user device 110 type, or in a situation where the camera 130 is moveable with respect to the screen 120) and can be determined through a calibration process. In some implementations, the spatial relationship between the camera 130 and screen 120 is assumed to remain constant during use of the parallax viewer system (for example, after calibration). For example, the screen 120 and camera 130, if separate from the user device 110 may be placed on a surface, such as a desk, during use, or the screen 120 and camera 130 may be integrated into the same user device 110 (such as a smartphone or laptop as shown in FIG. 1) and therefore maintain the same spatial relationship 140.

Figure 1B:
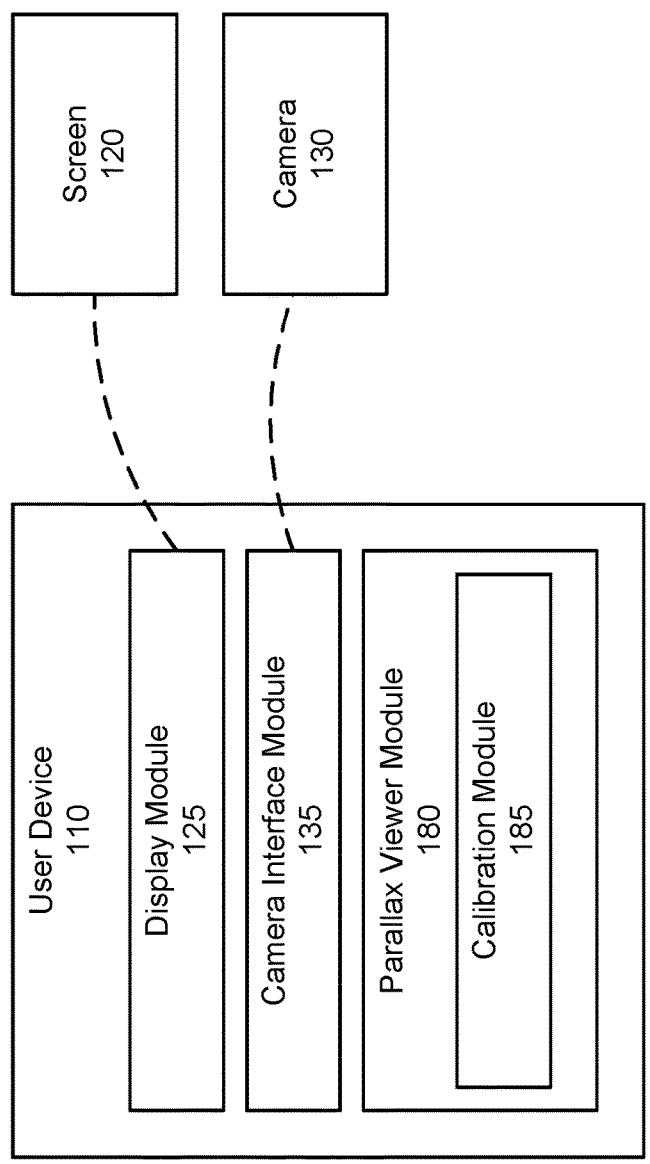
FIG. 1B is a block diagram of an example parallax viewer system, according to one embodiment.

FIG. 1B is a block diagram of an example parallax viewer system, according to one embodiment. As described above, the user device 110 is a computing device capable of displaying 3D content to a user as part of a parallax viewer system. The user device 110 of FIG. 1B comprises a display module 125, camera interface module 135, a parallax viewer module 180 including a calibration module 185, the screen 120, and camera 130. As described above, the screen 120 and camera 130 may be integrated into the user device 110 or be a separate devices communicatively connected to the user device 110.

In some embodiments, the display module 125 allows the user device 110 to communicate with and display content on the screen 120. For example, the user device 110 can provide content (such as 3D content) for display on the screen 120. Similarly, the camera interface module 135 allows the user device 110 to communicate with the camera 130, according to some implementations. For example, the camera interface module 135 can allow the user device receive image data captured by the camera 130.

The parallax viewer module 180 can enable the user device 180 to provide a simulated 3D view of a 3D environment (or other suitable 3D content) to a user viewing the screen 120 which is reactive to motion of the user (i.e. the user viewpoint 170) relative to the screen 120. For example, the parallax viewer module 180 can provide a user viewing the screen 120 with a window-like view into the 3D content, increasing the immersion of viewing the 3D content without the use of specialized equipment or hardware. To use the parallax viewer module 180 with a specific user device 110, the calibration module 185 enables the user device 110 to determine the spatial relationship 140 between the screen 120 and the camera 130, according to some embodiments.

System Calibration

In some embodiments, the calibration module 185 calibrates the parallax viewer system. For example, calibration can include determining the spatial relationship 140 between the screen 120 and the camera 130. In some embodiments, the calibration process allows the parallax viewer system to perform a "calibration transform" based on the spatial relationship 140, which transforms spatial coordinates determined with respect to the camera 130 into spatial coordinates relative to the screen 120. The spatial relationship 140 can be an offset, rotation, scaling, or any other suitable relationship between coordinates relative to the camera 130 (for example, coordinates in a coordinate system with an origin centered on the camera 130) and corresponding coordinates relative to the screen 120. Thus, given a coordinate for a face or eye of a user viewing the screen 120 (and, in some embodiments, an estimated depth) in the view of the camera 130, the parallax viewer module 180 can use the spatial relationship 140 determined through calibration to transform coordinates relative to the camera 130 into coordinates relative to the screen 120.

In some implementations, the user can initiate face tracking on the camera 130, for example through the user device 110. For example, the user can select a privacy setting to allow face positional information to be used by the parallax viewer system, or can affirmatively select to begin face tracking to view 3D content or to calibrate the parallax viewer system. In some implementations, the user device and/or parallax viewer system only receives relevant positional information of the face from the face tracking software, which additionally may obscure or avoid providing individual facial characteristics or high resolution camera images from the camera 130. Face tracking can continuously (or at defined intervals) return a positional coordinate of an eye of the user (or other relevant point of interest) relative to the camera 130 (hereinafter, a "camera coordinate position"). For example, in FIG. 1A, the camera coordinate position 150 representing the user's viewpoint 170 can be a camera coordinate position generated using face tracking. In some implementations, face tracking returns a camera coordinate position including the XYZ coordinates (i.e. 3D coordinates) of the location of an eye (or eyes) of a user relative to the position of the camera 130, but other implementations may only return 2D coordinates (such as the coordinates of the user's location in the current image output of the camera 130). In some embodiments, camera coordinate positions determined through face tracking include an estimated depth of the viewpoint, for example, determined based on the size of the user's face in the camera output, based on other depth calibration or detection of the camera coordinate positioning, or based on any other suitable factor.

According to some embodiments, the calibration module 185 can determine a camera coordinate position 150 based on any other suitable method. For example, using a printed calibration target or other object (in some cases of a known size) known to the calibration module 185. Similarly, in some implementations, the calibration module 185 can store a set of pre-determined spatial relationships (for example, for different types of user devices 110, or for previously calibrated configurations). To determine the spatial relationship 140 and calibrate a transform from the camera coordinate position to a position in a coordinate system relative to the screen 120 (hereinafter a "screen coordinate position"). Received camera coordinate positions can be matched with rays emanating perpendicular to the screen 120 from specific locations on the screen 120 (for example, corresponding to one or more pixels of the screen), hereinafter, "screen rays." In some embodiments, the screen coordinate position corresponding to a given camera coordinate position is assumed to be located at some point along a screen ray associated with the given camera coordinate position.

Figure 2:
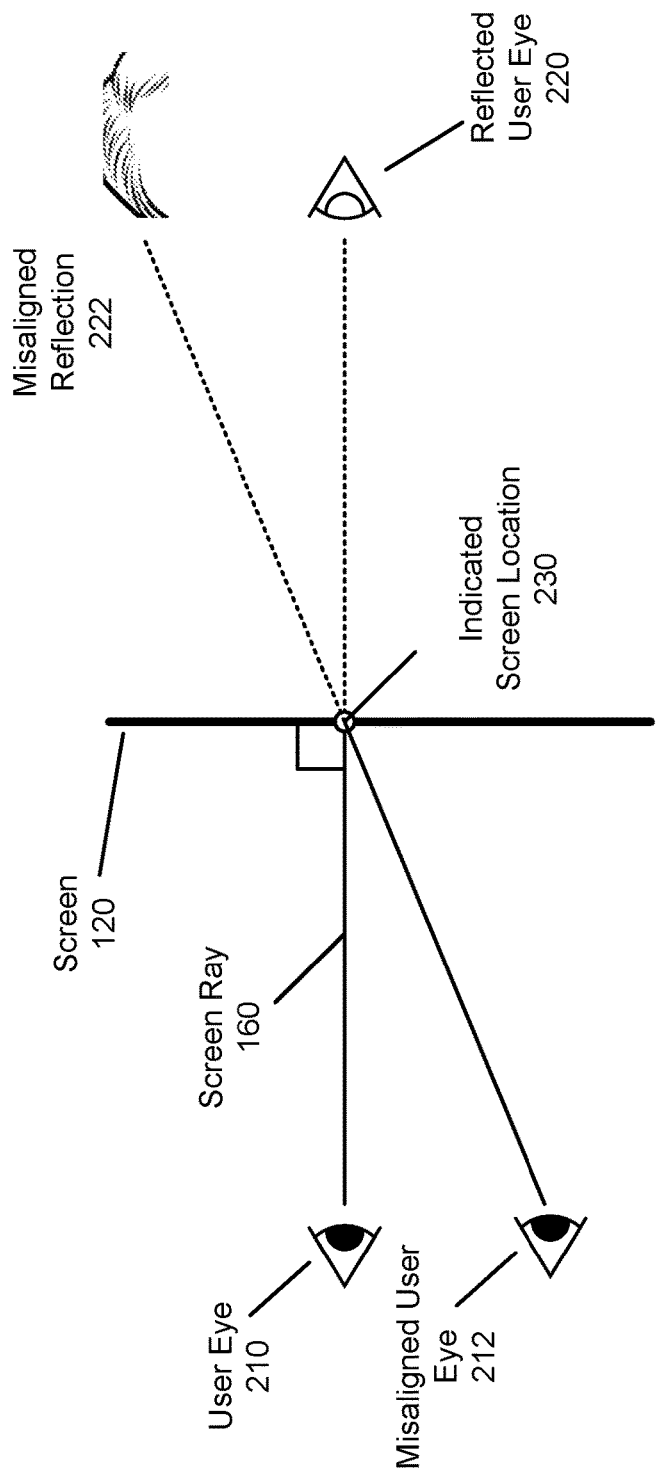
FIG. 2 illustrates an environment including a reflective screen viewed by a user's eye, according to one embodiment.

According to some embodiments, the calibration module 185 can generate pairs of camera coordinate positions and the corresponding screen rays 160 (hereinafter, "calibration pairs") as part of the calibration process. That is, in some implementations of calibrating a parallax viewer system, a screen ray 160 can be associated with a corresponding position of a user's eye by using reflective properties of the screen 120. The screen 120 can act as a mirror (due to a glossy or otherwise reflective surface) and reflect the user's face as the user looks at the screen 120. These reflections of the user in the screen 120 can be used to determine the spatial relationship 140 for later use by the parallax viewer module 180. FIG. 2 illustrates an environment 200 with a screen 120 and a user eye 210 representing the physical eye of a user viewing the screen 120. An indicator can be displayed on the screen 120 at an indicated screen location 230. The user may be instructed to move their eye (in this case, the user eye 210) such that the reflection of their eye is positioned at the indicated screen location 230. In the embodiment of FIG. 2, the screen 120 is reflective. Therefore, when the user is in a position to see the reflected user eye 220 at the location of the indicated screen position, the user eye 210 is at a position that along the screen ray 160 perpendicular to the screen and directly across from the indicated screen location 230. This approach to calibration utilizes a property of reflective surfaces (such as the screen 120) that the ray between a viewpoint (such as the dominant eye of a user) and the reflection of that viewpoint in the reflective surface, (as seen from that viewpoint) will be perpendicular to the reflective surface. That is, in the embodiment of FIG. 2, if a user is directly viewing (from the user eye 210) the reflected user eye 220, the ray between the reflected image 225 and the user eye 210 will be perpendicular to the surface of the screen 120. Therefore, when correctly aligned, the user eye 210 is positioned somewhere along the screen ray 160 associated with the screen location 230. Based on the alignment between the reflected user eye 220 and the indicated screen location 230, the calibration module 185 can generate a calibration pair comprising the screen ray 160 (the screen ray associated with the indicated screen location 230) and the tracked position of the user eye 210 (for example, based on face tracking information from the camera 130).

However, when the user's eye is misaligned 212 and the user looks at the indicated screen location 230, rather than seeing the reflected user eye 220, the user will see a misaligned reflection 222 at the screen location 230. As shown in FIG. 2 for the position of misaligned user eye 212, the misaligned reflection 222 shows another part of the user's head (here, the user's forehead). In some implementations, the calibration module 185 generates a plurality of calibration pairs by aligning the reflections of the user eye 210 with various indicated screen locations.

Returning to FIG. 1A, the parallax viewer system can be calibrated by matching camera coordinate positions 150 (relative to the camera) with corresponding screen rays 160 (relative to the screen) for various user viewpoints 170. As described above, face tracking software can determine a camera coordinate position based on the output of the camera 130. To match the returned camera coordinate positions with corresponding screen rays, some implementations can use the reflective properties of screens, as described above. For example, an indicator (such as a dot or other suitable small graphic) can be displayed on the screen 120 at a known screen location and the user can be instructed to align the reflection of their eye (which can be simultaneously tracked by the camera 130 via face tracking) with the indicator. After the indicator is displayed and the user is instructed to align the reflection of their eye with the indicator, the parallax viewer system can then determine when the user has aligned their eye. For example the parallax viewer system can assume the user's eye is aligned based on a threshold elapsed time since the indicator was displayed, based on a confirmation that the user's eye is aligned (such as a button press or other a user input), or based on inferring that the user's eye is aligned based on the user keeping still (determined by the face tracking software). As discussed above, while the user is viewing their eye's reflection aligned with the indicator on the screen 120, the user's viewpoint will be aligned with the screen ray 160 emanating from the screen location of the indicator. Then, the calibration module 185 can determine the corresponding calibration pair including the screen ray 160 associated with indicated screen location and the currently tracked camera coordinate position of the user's viewpoint 170. To obtain additional calibration pairs, the calibration process repeats the process of displaying an indicator (this time at a different location on the screen), aligning the user's eye with the indicator (for example, via instructing the user to align their eye with the indicator), and associating the resulting camera coordinate position and screen ray into a calibration pair. In some embodiments, the screen locations used to generate calibration pairs are selected randomly, however, screen locations can also be determined based on a preset pattern or sequence, be selected based on user input, or otherwise chosen using any suitable method.

After a suitable number of calibration pairs have been determined (for example, based on a threshold number of calibration pairs or a selection from a user), the spatial relationship 140 (and the corresponding calibration transform between a camera coordinate position and the corresponding screen coordinate position) can be determined using a suitable solver, such a iterative nonlinear solver, linear solver, or using any other suitable solving method. Stated another way, the solver attempts to determine a transform that minimizes an error for each of the generated calibration pairs. The generated calibration transform can then be used to determine a screen coordinate position (for example, in the form of XYZ coordinates with respect to the screen 120) for any camera coordinate positon of a user's viewpoint. Although generated based on screen rays 160 associated with designated screen locations 230, the calibration transform may be used to generate screen coordinate positions that do directly correspond to a screen ray 160. For example, a user may move to the side or above the screen 120 itself but still be viewable and trackable by the camera 130. Because a calibration transform describes the spatial relationship 140 between the camera 130 and the screen 120, any user movements captured by the camera 130 can be effectively translated to a screen coordinate system for use by the parallax viewer system (for example, to simulate the appearance of a 3D environment from the captured viewpoints).

Figure 3:
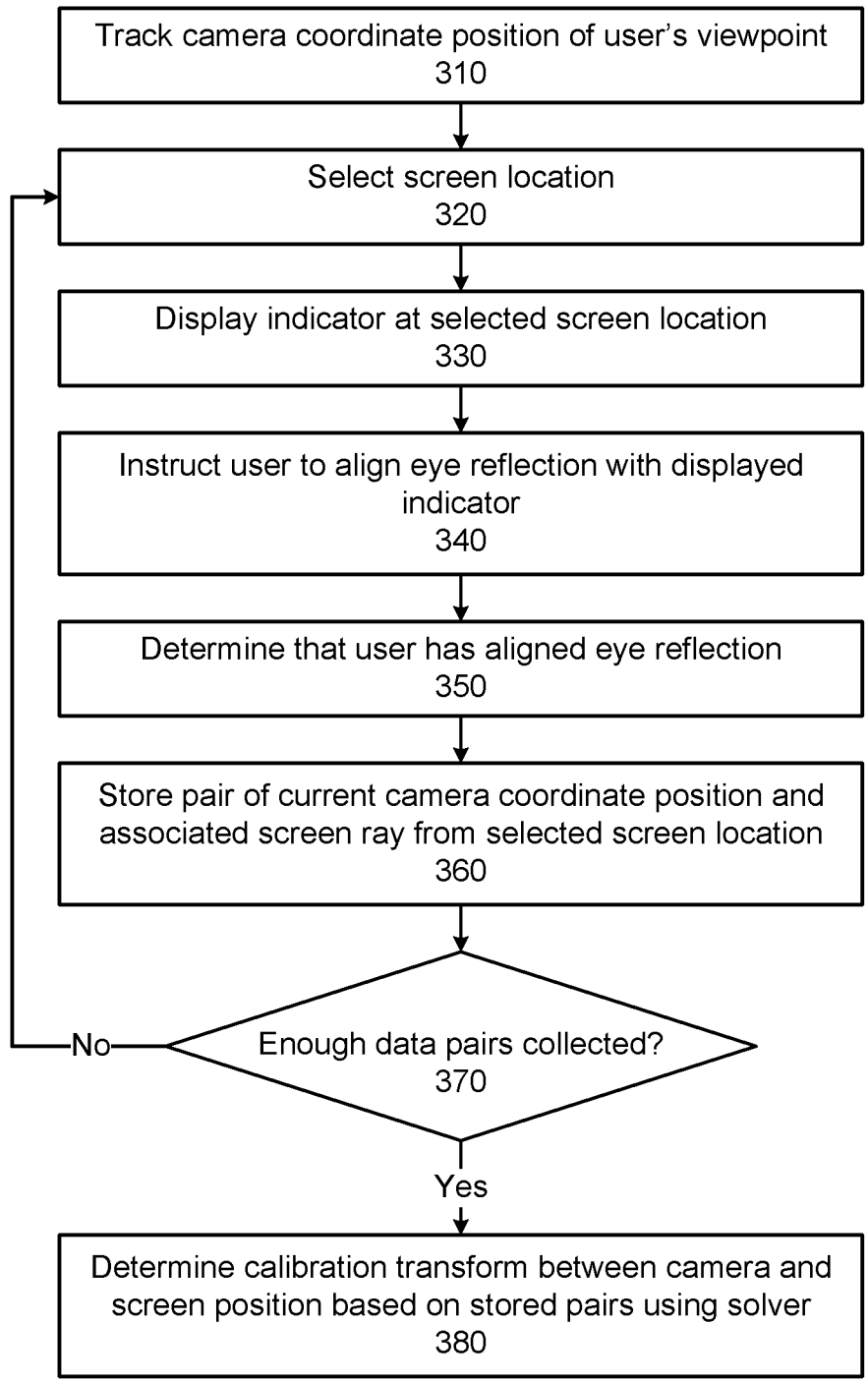
FIG. 3 is a flowchart illustrating an example process for calibrating a parallax viewer system, according to one embodiment.

FIG. 3 is a flowchart illustrating an example process for calibrating a parallax viewer system. The process 300 begins by tracking 310 the camera coordinate position of a user's viewpoint, for example using face tracking software. For calibration, a screen location is then selected 320, for example randomly, semi-randomly, based on a defined pattern or sequence, or based on user input. An indicator for the selected screen location is then displayed 330 on the screen at the selected screen location. The user is then instructed 340 to align the reflection of their eye in the screen with the displayed indicator and the system determines 350 that the user has aligned the eye reflection as instructed. The tracked camera coordinate position and the screen ray associated with the selected screen location are then recorded 360 as a calibration pair, and the process is repeated from step 320 until enough calibration pairs are collected 370 to calibrate the parallax viewer system. Finally, a solver can be used to determine 380 the calibration transform between the camera and screen position based on the stored calibration pairs. The calibrated parallax viewer system can then be used to display 3D content, as will be described further below.

Parallax Viewer Operation

As described above, the parallax viewer system allows a user to view 3D environments through the screen 120. A parallax viewer system operating on a user device can use the camera 130 screen 120 display a 3D environment to the viewing user. For example, the position of the user's viewpoint 170 relative to the screen 120 can be continuously tracked via the camera 130. Based on this information, the parallax viewer system can provide a simulated 3D view of a 3D environment (or other suitable 3D content) to a user viewing the screen 120.

Figure 4:
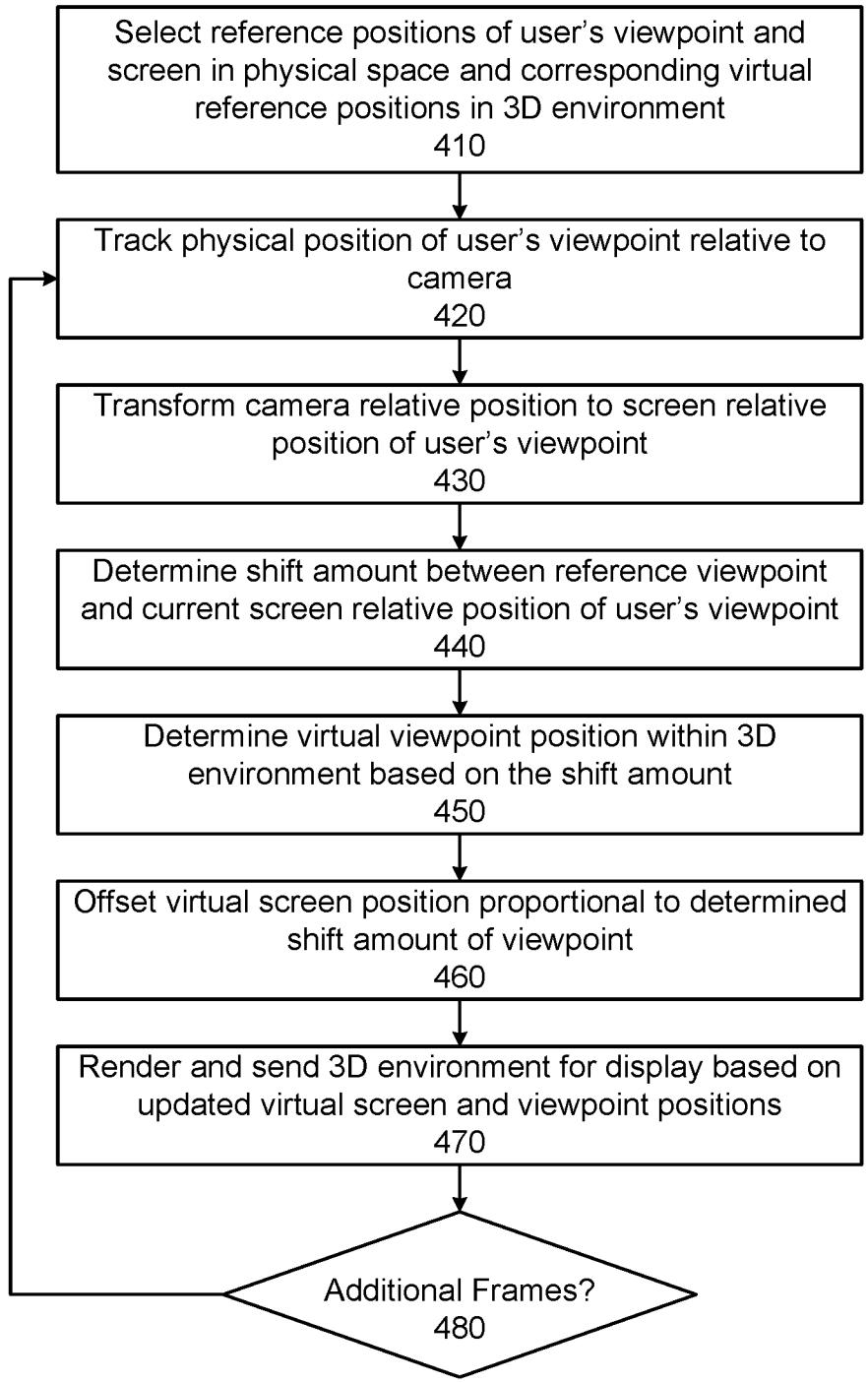
FIG. 4 is a flowchart illustrating an example process for displaying a 3D environment to a user, according to one embodiment.

FIG. 4 is a flowchart illustrating an example process for displaying a 3D environment to a user. The process 400 begins when reference positions of the user's viewpoint (for example, the user's dominant eye, or an average location between the user's eyes) and the screen in physical space are selected 410 and associated with corresponding virtual viewpoint and screen reference positions in the 3D environment. In some embodiments, the virtual viewpoint reference position and virtual screen reference position are used to initialize the view of the 3D environment presented on the screen and to provide frame of reference for subsequent changes to the displayed view of the 3D environment. Within the 3D environment, changes to the virtual viewpoint and screen positions based on tracked movement of the user and/or other factors can be determined relative to the virtual reference positions. The virtual screen reference position can be determined based on the desired initial view of the 3D environment when displaying the 3D content (or based on any other suitable factor). In some embodiments, the parallax viewer system determines the physical locations of the viewpoint in a coordinate system relative to the screen 120, therefore the physical screen reference position is the origin of the screen relative coordinate system. The physical viewpoint reference position can be an initial location of the user's viewpoint or a defined to be a fixed distance from the center of the screen. For example, the viewpoint reference position (both in physical space and in the 3D environment) can specified as a defined distance, such as 60 cm, in front of the screen 120. In some implementations, the virtual viewpoint reference position is chosen to maintain the same spatial relationship between the physical viewpoint reference position and the physical screen reference position. The 3D environment can then be initialized based on the virtual viewpoint reference position and the virtual screen reference position.

After the 3D environment is initialized, the parallax viewer system can display 3D content to the user. To display the 3D environment, the parallax viewer system can track 420 the current position of the user's viewpoint relative to a camera (the "camera relative position") of the parallax viewer system. For example, a camera coordinate position of the user's current viewpoint can be determined using face tracking techniques and the output of the camera 130, as described above. The parallax viewer system can then transform 430 the tracked camera relative position into to a screen relative position (a position of the user's viewpoint relative to a screen 120 of the parallax viewer system). For example, the parallax viewer system can use a calibration transform as described above to transform the camera relative position. To describe the change in physical position of the user, the parallax viewer system determines 440 a shift amount based on the current screen relative position and the physical viewpoint reference position. In some embodiments, the shift amount is determined based on a previous viewpoint of the user (for example, a viewpoint of a previous frame) instead of shifting the user's viewpoint from the reference position in each frame. Based on the shift amount, the parallax viewer system can determine 450 the virtual viewpoint in the 3D environment for the current frame. For example, the virtual viewpoint can be offset by the shift amount from the virtual viewpoint reference position.

In some embodiments, the parallax viewer system also offsets 460 the virtual screen position based on the same determined shift amount. Although, the physical screen 120 may not have physically moved from the physical screen reference position, some embodiments of a parallax viewer system can offset the virtual screen position based on changes in user viewpoint to achieve a desired user experience. Depending on the implementation, the virtual screen position can be offset by the shift amount, proportional to the shift amount, or remain static virtual screen reference position. The shift of the virtual screen, which can vary based on embodiment, distance to objects in the 3D environment, or other suitable factor, will be discussed further below.

Finally, based on the current (shifted) virtual viewpoint position and virtual screen position, the parallax viewer system can render 470 and send the 3D environment for display to the user. For example, the rendered 3D environment can be displayed to the user via the screen 120 in realtime or substantially in realtime. The parallax viewer system can user any suitable rendering technique to render the 3D environment. For example, OpenGL rendering can be used to render the 3D environment, with the virtual viewpoint as the rendering camera location and the rendering frustum using the virtual screen position as the near rendering plane. A frustum is a 3D shape (resembling a pyramid with the top cut off) often used to represent the field of view of a virtual camera used to render a 3D environment. The process 400 can then be repeated from step 420 for any additional frames 480 to be rendered, based on a change in the tracked user camera relative position, or for any other suitable reason.

In some implementations, the motion (or non-motion) of the virtual screen position is informed by a secondary virtual screen (hereinafter, a "guide screen") represented in the 3D environment at a location beyond the virtual screen reference position. For example, the guide screen can represent a theoretical larger screen further from the user than the actual screen 120 that initially has the same field of view as would be seen through the screen 120. In some examples, the virtual screen position can be shifted such that the user viewpoint maintains a field of view through the screen 120 that extends to the edges of the guide screen. That is, the parallax viewer system can use the screen 120 to simulate a larger guide screen by shifting the virtual screen position within the 3D environment to maintains a field of view that corresponds to the field of view of the user were viewing a larger, more distant guide screen.

Figure 5:
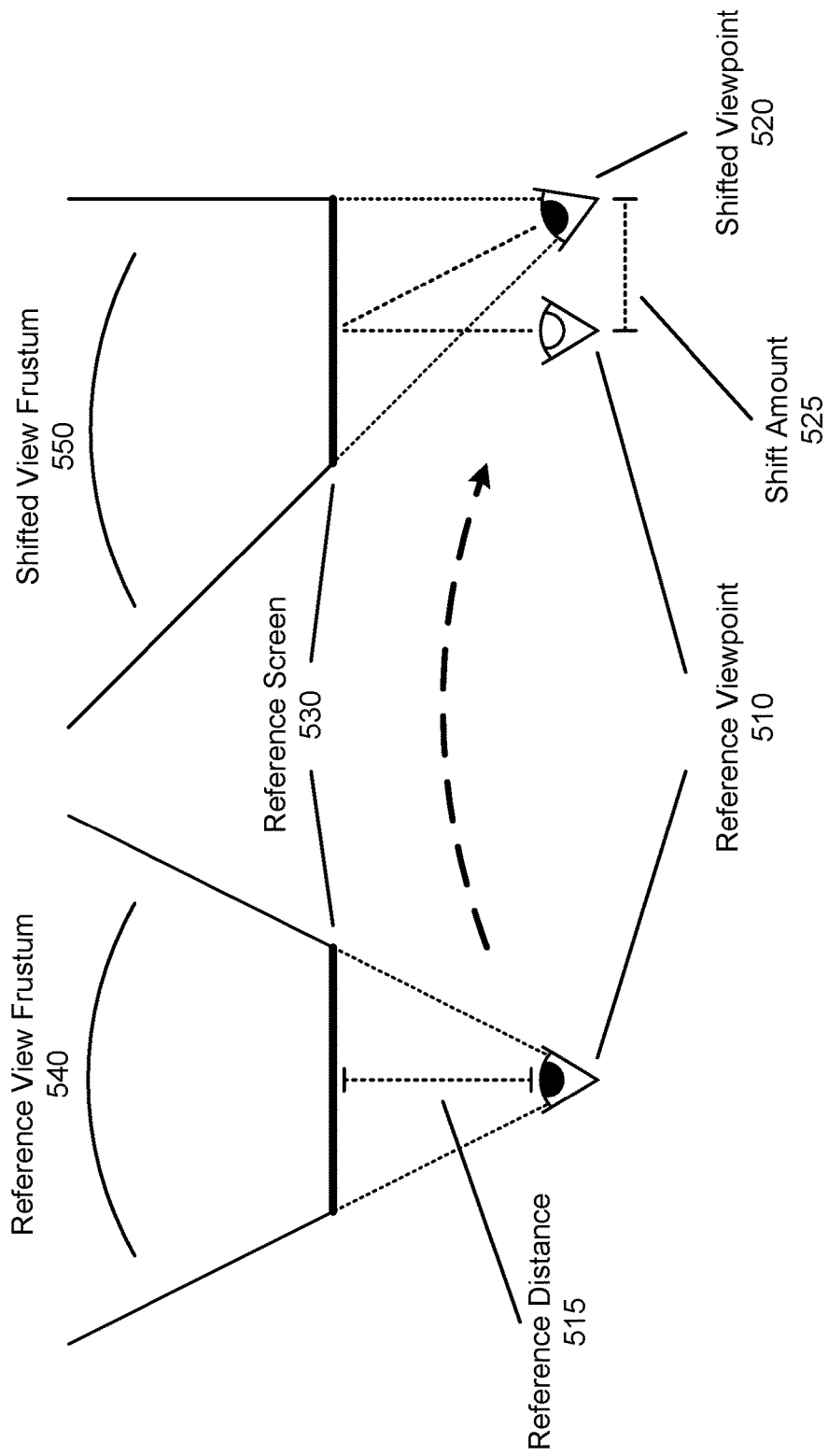
FIG. 5 illustrates an example environment where a virtual viewpoint is shifted while viewing a static virtual screen, according to one embodiment.

FIG. 5 illustrates an example environment 500 where the virtual screen position remains static, simulating a window into the 3D environment (hereinafter the "portal implementation"). For example, a parallax viewer system using the portal implementation would shift the virtual viewpoint but not the virtual screen position in response to tracked user movement. However, depending on the 3D environment (or other 3D content), the virtual screen may be shifted due to other reasons, for example, when rendering a 3D environment simulating being in a moving car. The environment 500 of FIG. 5 includes a reference viewpoint 510 positioned a reference distance 515 from a reference screen 530. Correspondingly, a reference view frustum 540 is produced when the 3D environment is rendered using the reference viewpoint 510 as the render camera location and the reference screen 530 as the near render plane. As described above, the reference view frustum 540 can determine which objects/areas of the 3D scene are viewable in the rendered image sent to the screen 120 for display. Later in the operation of the parallax viewer system, the virtual viewpoint can shift, moving from the reference viewpoint 510 to a shifted viewpoint 520, offset from the reference viewpoint by a shift amount 525. In the portal implementation, the virtual screen is not shifted based on the change in the virtual viewpoint and the reference screen 530 position is still used to render the 3D scene after the shift in the virtual viewpoint. At this point, the 3D environment can be rendered based on a shifted view frustum 550 using the shifted viewpoint 520 as the render camera location and the reference screen 530 as the near rendering plane. In some situations, the shifted view frustum 550 can be very different (both in shape and field of view) form the reference view frustum, even for a relatively small shift in the virtual viewpoint.

The portal implementation of a parallax viewer system can use the screen 120 to directly simulate a portal (such as a window) into a 3D environment when looking at the screen 120. Therefore, maintaining a static virtual screen position most closely (in a theoretical sense) approximates how the view through a real world "portal" into the 3D environment would function as viewed from the user's viewpoint. The portal implementation can accurately represent virtual objects on or near to the plane of the screen 120, allowing the user to simulate looking at near objects from different angles. However, as with a real window viewed from a short viewing distance, the portal implementation can produce a screen image which rapidly shifts based on relatively small shifts in the user's viewpoint. For example, when rendering 3D environments with primarily background or midground scenery even a small shift in the user's viewpoint can cause almost entirely difference scenery to be displayed on the screen 120. This problem can be exaggerated when the screen 120 is relatively small, such as a smartphone screen. Further, the rapid shifts of the shifted view frustum 550 of the portal implementation can amplify any errors or artifacts in the calibration or face tracking techniques used to determine the user viewpoint, producing a shaky rendered image. Further, some users may not expect rapid shifts in the rendered content in the context of viewing content on a screen.

Figure 6:
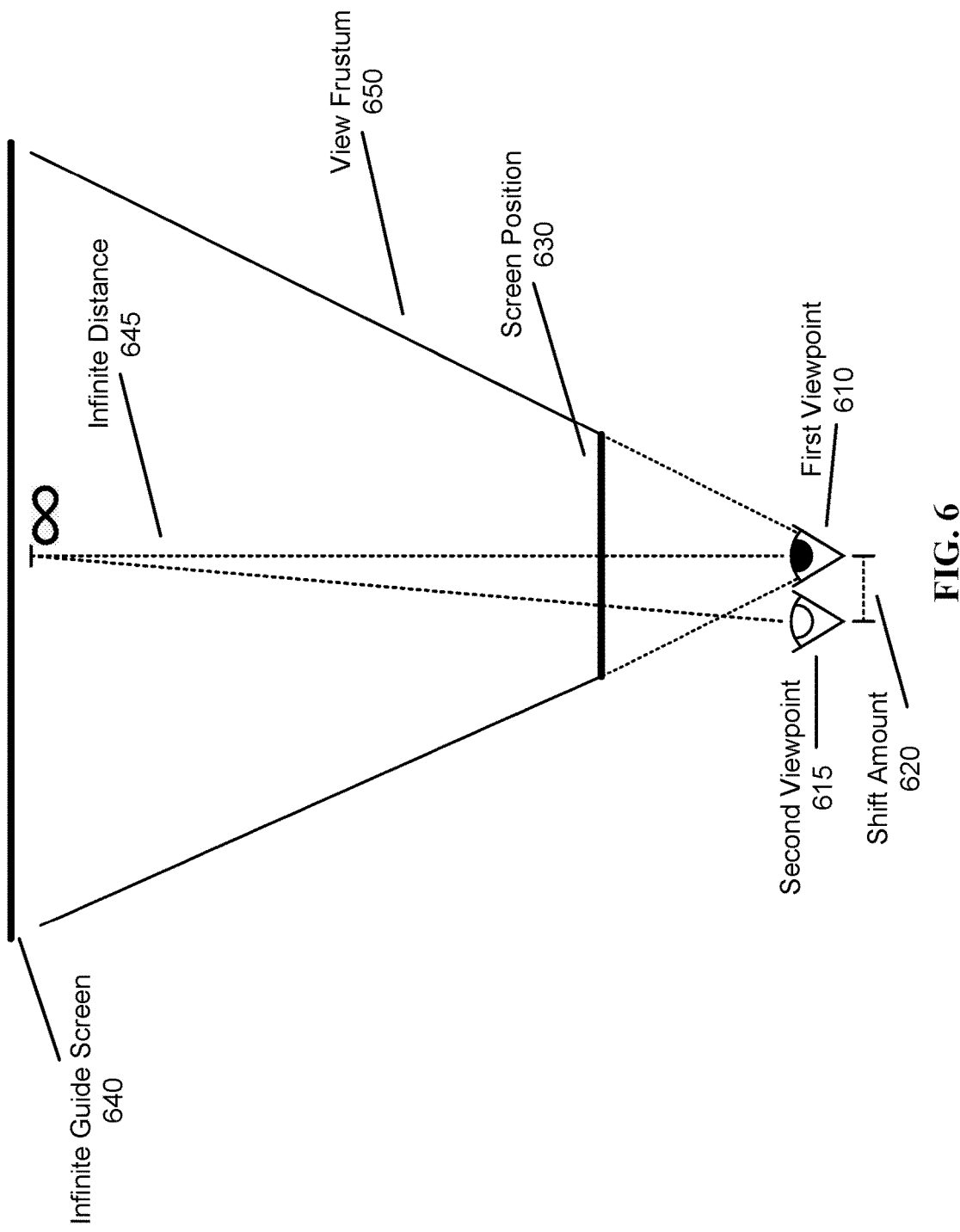
FIG. 6 illustrates an example environment where a virtual viewpoint shifts while viewing an infinitely large and distant virtual screen, according to one embodiment.
Figure 7:
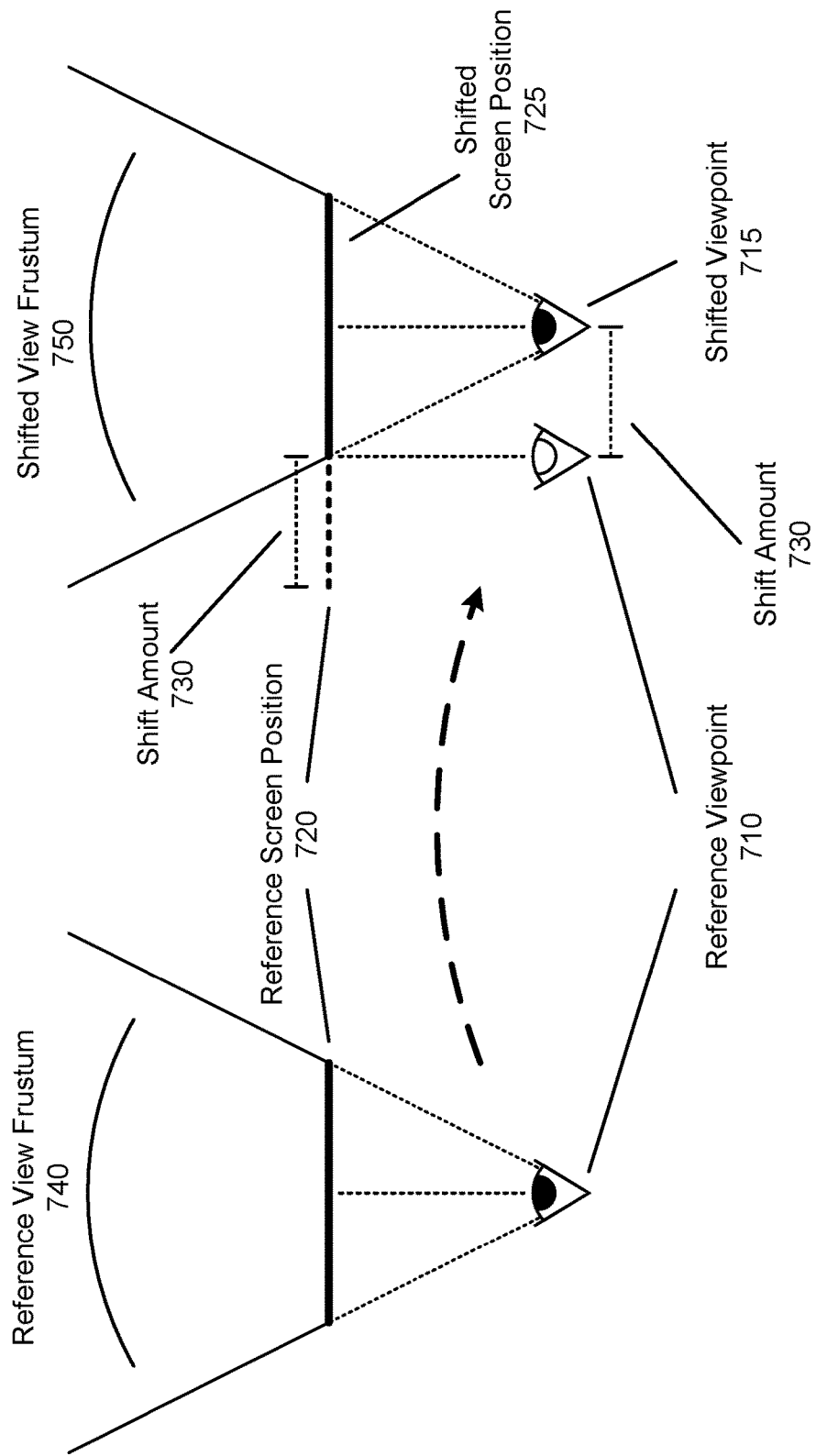
FIG. 7 illustrates an example environment where an infinite screen is approximated by shifting a reference screen with a viewpoint, according to one embodiment.

In some implementations, the parallax viewer system shifts the virtual screen position along with any shift in the user's viewpoint, causing the virtual screen and virtual viewpoint to move together within the 3D environment (hereinafter, the "infinite screen implementation"). Alternately, the infinite screen implementation can be thought of as using the screen 120 to imitate the view of an infinitely large and infinitely distant guide screen as the user's viewpoint moves. FIG. 6 illustrates an example environment 600 where a viewpoint shifts while viewing an infinite screen. The environment 600 includes a first viewpoint 610 within the 3D environment 600, which is shifted by a shift amount 620 to a second viewpoint 615. Rendering the 3D environment 600 using the first viewpoint 610 and virtual screen position 630 results in the view frustum 650. The view frustum 650 simulates the view from the first viewpoint 610 of the infinite guide screen 640 presented at an infinite distance 645. However, when shifting from the first viewpoint 610 to the second viewpoint 615, the resulting (non-infinite) shift amount 620 is infinitely small compared to the infinite size and distance 645 of the infinite guide screen 640. Therefore, the view of the infinite guide screen 640 (and therefore the angles/field of view of the view frustum 650 required to simulate that view) remain the same after the shift 620 to the second viewpoint 615. However, the screen position 630 no longer effectively simulates the view of the infinite guide screen when viewed from the second viewpoint 615. Therefore, in order to maintain the correct view frustum 650, the screen position 630 must also shift by the same shift amount 620 (as shown in FIG. 7). In practice, the infinite screen implementation can be modeled by shifting the virtual screen position directly with the motions of the virtual viewpoint. That is, the virtual screen position may move in one to one proportion to the shift with the virtual viewpoint.

FIG. 7 illustrates an example environment 700 where a viewpoint and screen are shifted using the infinite screen implementation. The environment 700 includes a reference viewpoint 710 associated with a reference screen position 720 which, when rendered, generates a reference view frustum 740. After a shift in the physical viewpoint position, both the virtual viewpoint and virtual screen position are translated by the shift amount 730, resulting in the shifted viewpoint 715 and the shifted screen position 725. The shifted viewpoint and screen position 715 and 725 remain in the same relative orientation, but are shifted within the 3D environment by the shift amount 730. The shift results in a shifted view frustum 750, which retains the same shape and angle of view as the reference view frustum 740, but has similarly been moved by the shift amount 730.

When compared with the portal implementation, the infinite screen implementation can result in less change in the field of view of the 3D environment, and therefore produces a more stable final output. Further, the infinite screen implementation retains many of the immersion benefits of the parallax viewer system. For example, as the user's viewpoint still moves within the 3D environment responsive to the movement of the user relative to the screen 120. However, because the orientation between the virtual viewpoint and virtual screen position remains static, the ability of a user to control the angle at which they view the 3D environment is limited. For example, the infinite screen implementation allows a user to look around near objects to see obscured objects in the 3D environment (such as by leaning to move the virtual viewpoint around an obstructing foreground object). However, as the virtual viewpoint and virtual screen position remain in the same relative orientation in the 3D environment, the infinite implementation can limit the ability of a user to the angle at which they view the 3D environment, according to some embodiments.

Figure 8:
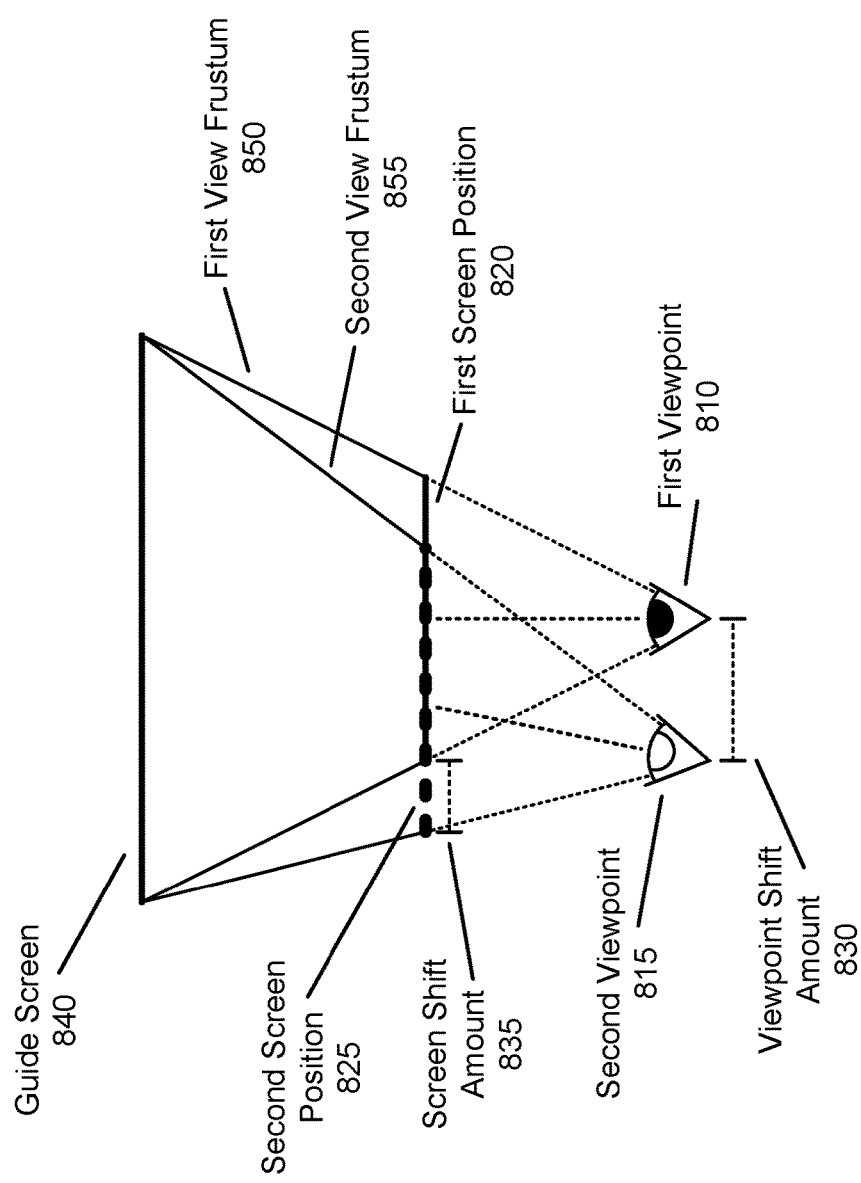
FIG. 8 illustrates an example environment where a virtual viewpoint shifts while viewing a guide screen, according to one embodiment.

Some embodiments use an intermediate solutions between the portal and infinite screen implementations. For example, a "proportional shift implementation" can be used, which shifts the virtual screen position as a fraction or proportion of the change in the virtual viewpoint. Alternatively, the proportional shift implementation can be thought of as using the screen 120 to approximate the view of a larger guide screen positioned at a proportionally larger distance from the reference viewpoint position. FIG. 8 illustrates an example environment 800 where a user viewpoint shifts while viewing a guide screen. The environment 800 includes a first viewpoint 810 which is shifted by a viewpoint shift amount 830 to a second viewpoint 815. Initially, rendering the 3D environment 800 using the first viewpoint 810 and first screen position 820 results in the first view frustum 850, which simulates the view of the guide screen 840 from the first viewpoint 810. However, when the viewpoint is shifted from the first viewpoint 810 to the second viewpoint 815, the virtual screen position must also be shifted to continue simulating the guide screen 840. Therefore, the parallax viewer system can shift the virtual screen position by the screen shift amount 835 from the first screen position 820 to the second screen position 825. The resulting second view frustum 855 simulates the view of the guide screen 840 from the second viewpoint 815. However, the resulting screen shift amount 835 is not equal to the viewpoint shift amount, but is instead a fraction corresponding to the difference in size between the guide screen 840 and the actual size of the screen 120.

In practice, the proportional shift implementation can be modeled by shifting the virtual screen position by a proportion of the viewpoint shift amount used to shift the virtual viewpoint. For example, a proportion of 1:2 screen shift to viewpoint shift simulates a screen twice as large as the screen 120 positioned twice the reference distance away, and a proportion of 1:3 screen shift to viewpoint shift simulates a screen three times as large as the screen 120 and positioned three times the reference distance away. For example, in the embodiment of FIG. 8, the guide screen 840 is approximately twice the size of the screen 120, so the screen shift amount 835 is approximately half of the viewpoint shift amount 830.

Figure 9:
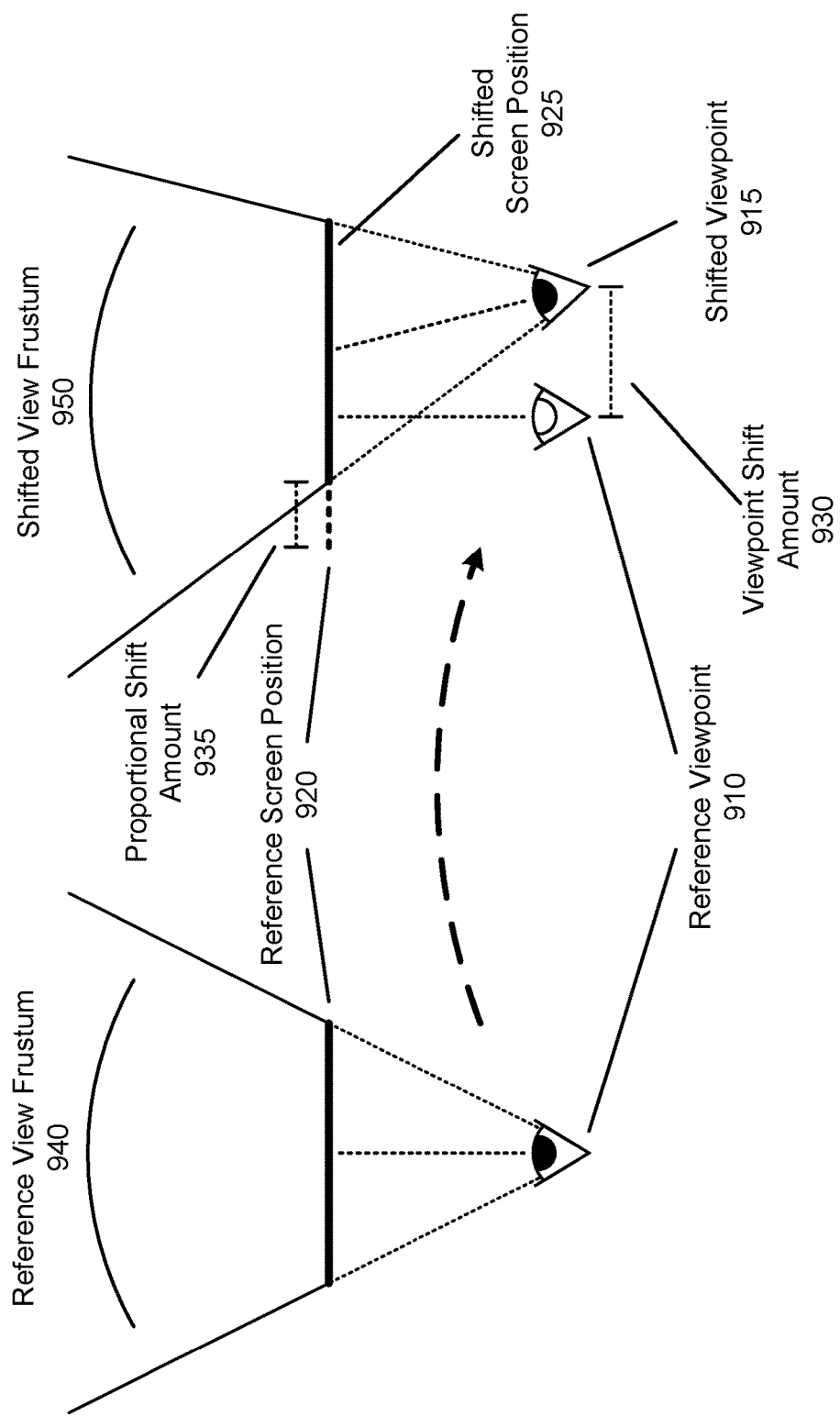
FIG. 9 illustrates an example environment where a virtual viewpoint and screen are shifted to approximate the view of a larger guide screen, according to one embodiment.

FIG. 9 illustrates an example environment 900 where a viewpoint and screen are shifted using the proportional implementation. The environment 900 includes a reference viewpoint 910 and associated with a reference screen position 920, which when rendered, correspond to a reference view frustum 940. When the virtual viewpoint is shifted from the reference viewpoint 910 to the shifted viewpoint 915 (shifting the virtual viewpoint by a viewpoint shift amount 930), the virtual screen position is proportionally shifted to from the reference screen position 920 to the shifted screen position 925. The proportional shift amount 935 can be any suitable fraction or factor of the magnitude of the viewpoint shift amount 930. For example, a fraction of 0.5 would result in the virtual screen position shifting half the amount, but in the same direction as the virtual viewpoint (where a factor of 1 would result in the infinite screen implementation and 0 results in the portal implementation). The resulting shifted view frustum 950 can be different both in position and in field of view to the reference view frustum 940. In some implementations, the proportional shift amount can vary based on the direction of the shift and/or the position of the virtual viewpoint relative to the reference virtual viewpoint. For example, a user viewpoint closer to the physical screen 120 than the reference viewpoint (for example, a user leaning in towards the screen 120) can result in a greater proportional shift than a user viewpoint further than the reference viewpoint. This "lean in" effect can narrow the field of view displayed on the screen 120 when the user moves closer to the screen 120, exaggerating the scaling effect of leaning in to the screen 120.

The proportional shift implementation can, depending on the fraction chosen, produce a more stable image than the portal implementation while retaining most advantages of the portal implementation over the infinite screen implementation. In some embodiments, the proportional shift implementation, like the portal implementation, allows a user to change the angle at which they view the 3D environment. However, because the changes in viewing angle are not as severe as the portal implementation, the proportional shift implementation, like the infinite screen implementation, can provide a stable image to the user as the user moves their viewpoints.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    tracking, by a user device, a relative position of a user viewpoint with respect to a screen;
    determining, by the user device, a shift amount between the user viewpoint and a user reference position, the shift amount determined based on the relative position of the user viewpoint and the screen;
    determining, based on the shift amount, a virtual user viewpoint position within the virtual environment and a virtual screen position within the virtual environment by:
        offsetting the virtual user viewpoint position from a virtual user reference position by the shift amount; and
        offsetting the virtual screen position from the virtual screen reference position by a second shift amount that is a non-unity fraction of the shift amount;
    rendering, by the user device, the virtual environment based on the virtual user viewpoint position and the virtual screen position; and
    transmitting, by the user device, the rendered virtual environment for display on the screen.

2. The method of claim 1, wherein tracking the relative position of a user viewpoint and the screen comprises:
    receiving, at the user device from a user-facing camera, camera output; and
    performing face tracking on the camera output to determine a relative position of the user viewpoint and the user-facing camera.

3. The method of claim 2, wherein tracking the relative position of a user viewpoint and the screen further comprises:
    transforming the relative position of the user viewpoint and the user-facing camera to the relative position of the user viewpoint and the screen based on a spatial relationship between the screen and the user-facing camera.

4. The method of claim 1, further comprising:
    determining, by the user device, a spatial relationship between the screen and the user-facing camera, based on a calibration process.

5. The method of claim 1, wherein rendering the virtual environment based on the virtual user viewpoint position and the virtual screen position comprises:
    selecting a view frustum for rendering the virtual environment wherein the virtual screen position the virtual screen position forms the near plane of the view frustum.

6. A non-transitory computer readable storage medium comprising instructions which, when executed by a processor cause the processor to perform the steps of:
    tracking, by a user device, a relative position of a user viewpoint with respect to a screen;
    determining, by the user device, a shift amount between the user viewpoint and a user reference position, the shift amount determined based on the relative position of the user viewpoint and the screen;
    determining, based on the shift amount, a virtual user viewpoint position within the virtual environment and a virtual screen position within the virtual environment by:
        offsetting the virtual user viewpoint position from a virtual user reference position by the shift amount; and
        offsetting the virtual screen position from the virtual screen reference position by a second shift amount that is a non-unity fraction of the shift amount;
    rendering, by the user device, the virtual environment based on the virtual user viewpoint position and the virtual screen position; and
    transmitting, by the user device, the rendered virtual environment for display on the screen.

7. The non-transitory computer readable storage medium of claim 6, wherein tracking the relative position of a user viewpoint and the screen comprises:
    receiving, at the user device from a user-facing camera, camera output; and
    performing face tracking on the camera output to determine a relative position of the user viewpoint and the user-facing camera.

8. The non-transitory computer readable storage medium of claim 7, wherein tracking the relative position of a user viewpoint and the screen further comprises:
    transforming the relative position of the user viewpoint and the user-facing camera to the relative position of the user viewpoint and the screen based on a spatial relationship between the screen and the user-facing camera.

9. The non-transitory computer readable storage medium of claim 6, further comprising:
    determining, by the user device, a spatial relationship between the screen and the user-facing camera, based on a calibration process.

10. The non-transitory computer readable storage medium of claim 6, wherein rendering the virtual environment based on the virtual user viewpoint position and the virtual screen position comprises:
    selecting a view frustum for rendering the virtual environment wherein the virtual screen position the virtual screen position forms the near plane of the view frustum.

11. A system comprising:
    a processor; and
    a non-transitory computer readable storage medium comprising instructions which, when executed by the processor cause the processor to perform the steps of:
        tracking, by a user device, a relative position of a user viewpoint with respect to a screen;
        determining, by the user device, a shift amount between the user viewpoint and a user reference position, the shift amount determined based on the relative position of the user viewpoint and the screen;

determining, based on the shift amount, a virtual user viewpoint position within the virtual environment and a virtual screen position within the virtual environment by:
- offsetting the virtual user viewpoint position from a virtual user reference position by the shift amount; and
- offsetting the virtual screen position from the virtual screen reference position by a second shift amount that is a non-unity fraction of the shift amount;

rendering, by the user device, the virtual environment based on the virtual user viewpoint position and the virtual screen position; and transmitting, by the user device, the rendered virtual environment for display on the screen.

12. The system of claim 11, wherein tracking the relative position of a user viewpoint and the screen comprises:

receiving, at the user device from a user-facing camera, camera output; and performing face tracking on the camera output to determine a relative position of the user viewpoint and the user-facing camera;

transforming the relative position of the user viewpoint and the user-facing camera to the relative position of the user viewpoint and the screen based on a spatial relationship between the screen and the user-facing camera.

* * * * *

UNITED STATES PATENT AND TRADEMARK OFFICE
CERTIFICATE OF CORRECTION

| | | |
|---|---|---|
| PATENT NO. | : 10,567,649 B2 | Page 1 of 1 |
| APPLICATION NO. | : 15/987747 | |
| DATED | : February 18, 2020 | |
| INVENTOR(S) | : Michael John Toksvig et al. | |

It is certified that error appears in the above-identified patent and that said Letters Patent is hereby corrected as shown below:

In the Claims

Column 14, Line 56, Claim 10, delete "wherein the virtual screen position" and insert -- wherein --.

Signed and Sealed this
Eighth Day of December, 2020

Andrei Iancu
*Director of the United States Patent and Trademark Office*